(12) United States Patent
Kageyama et al.

(10) Patent No.: US 11,874,257 B2
(45) Date of Patent: Jan. 16, 2024

(54) MASS SPECTROMETRY DEVICE AND MASS SPECTROMETRY METHOD

(71) Applicant: SHIMADZU CORPORATION, Kyoto (JP)

(72) Inventors: Ryo Kageyama, Kyoto (JP); Takeshi Uchida, Kyoto (JP); Masaru Nishiguchi, Kyoto (JP); Manabu Shimomura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 249 days.

(21) Appl. No.: 17/424,064

(22) PCT Filed: Feb. 15, 2019

(86) PCT No.: PCT/JP2019/005536
§ 371 (c)(1),
(2) Date: Jul. 19, 2021

(87) PCT Pub. No.: WO2020/166060
PCT Pub. Date: Aug. 20, 2020

(65) Prior Publication Data
US 2022/0128529 A1    Apr. 28, 2022

(51) Int. Cl.
*G01N 30/72* (2006.01)
*H01J 49/24* (2006.01)
*G01N 30/02* (2006.01)

(52) U.S. Cl.
CPC .......... *G01N 30/7206* (2013.01); *H01J 49/24* (2013.01); *G01N 2030/025* (2013.01)

(58) Field of Classification Search
CPC .......... G01N 30/7206; G01N 2030/025; H01J 49/24; H01J 49/005
See application file for complete search history.

(56) References Cited

U.S. PATENT DOCUMENTS

2016/0225596 A1* 8/2016 Hayden ............... H01J 49/0409
2018/0286657 A1* 10/2018 Welkie ................. H01J 49/063

FOREIGN PATENT DOCUMENTS

WO    2016/051554 A1    4/2016

OTHER PUBLICATIONS

International Search Report for PCT/JP2019/005536 dated Mar. 12, 2019 (PCT/ISA/210).
Written Opinion for PCT/JP2019/005536 dated Mar. 12, 2019 (PCT/ISA/237).

* cited by examiner

*Primary Examiner* — Peter J Macchiarolo
*Assistant Examiner* — John M Royston
(74) *Attorney, Agent, or Firm* — Sughrue Mion, PLLC (57) ABSTRACT

A mass spectrometry device includes a vacuum container in which an ionizer, a mass separator and a detector are arranged, and includes an opening-closing portion that is provided at the vacuum container and switches between a locked state of being locked in a close state and an unlocked state by a difference in pressure between inside and outside of the vacuum container, and a cooling gas introducer that introduces a cooling gas for cooling the ionizer into the vacuum container such that the opening-closing portion is kept in the locked state.

11 Claims, 7 Drawing Sheets

MASS SPECTROMETRY DEVICE AND MASS SPECTROMETRY METHOD

CROSS REFERENCE TO RELATED APPLICATIONS

This application is a National Stage of International Application No. PCT/W2019/005536 filed Feb. 15, 2019.

TECHNICAL FIELD

The present invention relates to a mass spectrometry device and a mass spectrometry method.

BACKGROUND ART

In an analysis using a mass spectrometry device such as a Gas Chromatograph-Mass Spectrometer (GC-MS), ionization is performed with the use of an ion source heated to a high temperature such as 140° C. to 350° C. under vacuum. Also after an analysis ends, the ion source is kept at the above-mentioned high temperature by heating under vacuum at a pressure equal to or lower than an allowable pressure such that a high boiling compound, etc. a boiling point of which is higher than a room temperature does not adhere to the ion source.

It is necessary to release the ion source into an atmospheric pressure when such a mass spectrometry device is maintained. At this time, unless the ion source is released to the atmospheric pressure after the temperature of the ion source is sufficiently reduced, a compound adheres to the ion source as described above, and the ion source is contaminated. In Patent Document 1, a GC-MS that cools an ion source by introduction of a carrier gas into the ion source is described. With the GC-MS, in a case where the temperature of the ion source is a predetermined temperature, a vacuum chamber is released to an atmosphere by opening of an electromagnetic valve that constitutes an opening-closing switcher.

CITATION LIST

[Patent Document]
[Patent Document 1] WO 2016/051554 A1

SUMMARY OF INVENTION

Technical Problem

In a case where an opening-closing portion such as door provided at a vacuum container internally having an ionizer is opened during cooling of the ionizer such as an ion source, the ionizer may be negatively affected such as being contaminated.

Solution to Problem

A first aspect of the present invention relates to a mass spectrometry device including a vacuum container in which an ionizer that ionizes a sample separated in a separator and produces ions, a mass separator that performs mass separation on the ions produced in the ionizer and a detector that detects ions obtained by mass separation in the mass separator are arranged, and the mass spectrometry device includes an opening-closing portion that is provided at the vacuum container and switches between a locked state of being locked in a close state and an unlocked state by a difference in pressure between inside and outside of the vacuum container, and a cooling gas introducer that introduces a cooling gas for cooling the ionizer into the vacuum container such that the opening-closing portion is kept in the locked state.

A second aspect of the present invention relates to a mass spectrometry device including a vacuum container in which an ionizer that ionizes a sample separated in a separator and produces ions, a mass separator that performs mass separation on the ions produced in the ionizer and a detector that detects ions obtained by mass separation in the mass separator are arranged, and the mass spectrometry device includes an opening-closing portion provided at the vacuum container, a cooling gas introducer that introduces a cooling gas for cooling the ionizer into the vacuum container, a determiner that determines whether cooling of the ionizer is finished after the cooling gas is introduced into the vacuum container, and a switcher that switches the opening-closing portion from a locked state of being locked in a close state to an unlocked state in a case where a result of determination made by the determiner represents that cooling is finished.

A third aspect of the present invention relates to a mass spectrometry method that is performed by a mass spectrometry device including a vacuum container in which an ionizer that ionizes a sample separated in a separator and produces ions, a mass separator that performs mass separation on the ions produced in the ionizer and a detector that detects ions obtained by mass separation in the mass separator are arranged, the vacuum container includes an opening-closing portion that switches between a locked state of being locked in a close state and an unlocked state by a difference in pressure between inside and outside of the vacuum container, and the mass spectrometry method includes introducing a cooling gas for cooling the ionizer into the vacuum container such that the opening-closing portion is kept in the locked state.

A fourth aspect of the present invention relates to a mass spectrometry method that is performed by a mass spectrometry device including a vacuum container in which an ionizer that ionizes a sample separated in a separator and produces ions, a mass separator that performs mass separation on the ions produced in the ionizer and a detector that detects ions obtained by mass separation in the mass separator are arranged, the mass spectrometry device includes an opening-closing portion that is provided at the vacuum container, and the mass spectrometry method includes introducing a cooling gas for cooling the ionizer into the vacuum container, determining whether cooling of the ionizer is finished after the cooling gas is introduced into the vacuum container, and switching the opening-closing portion from a locked state of being locked in a close state to an unlocked state in a case where a result of determination represents that cooling is finished.

Advantageous Effects of Invention

The present invention enables prevention of an opening-closing portion provided at a vacuum container from being opened during cooling of an ionizer and suppression of a negative effect such as contamination on the ionizer.

BRIEF DESCRIPTION OF THE DRAWINGS

2B is a conceptual diagram showing an unlocked opening-closing portion in the one embodiment

DESCRIPTION OF EMBODIMENTS

Embodiments of the present invention will be described below with reference to the drawings.

First Embodiment

A mass spectrometry device of the present embodiment is to open an opening-closing portion from which an ionizer is taken out based on a predetermined condition after a cooling gas is introduced into the ionizer.

(Regarding Mass Spectrometry Device)

Figure 1:
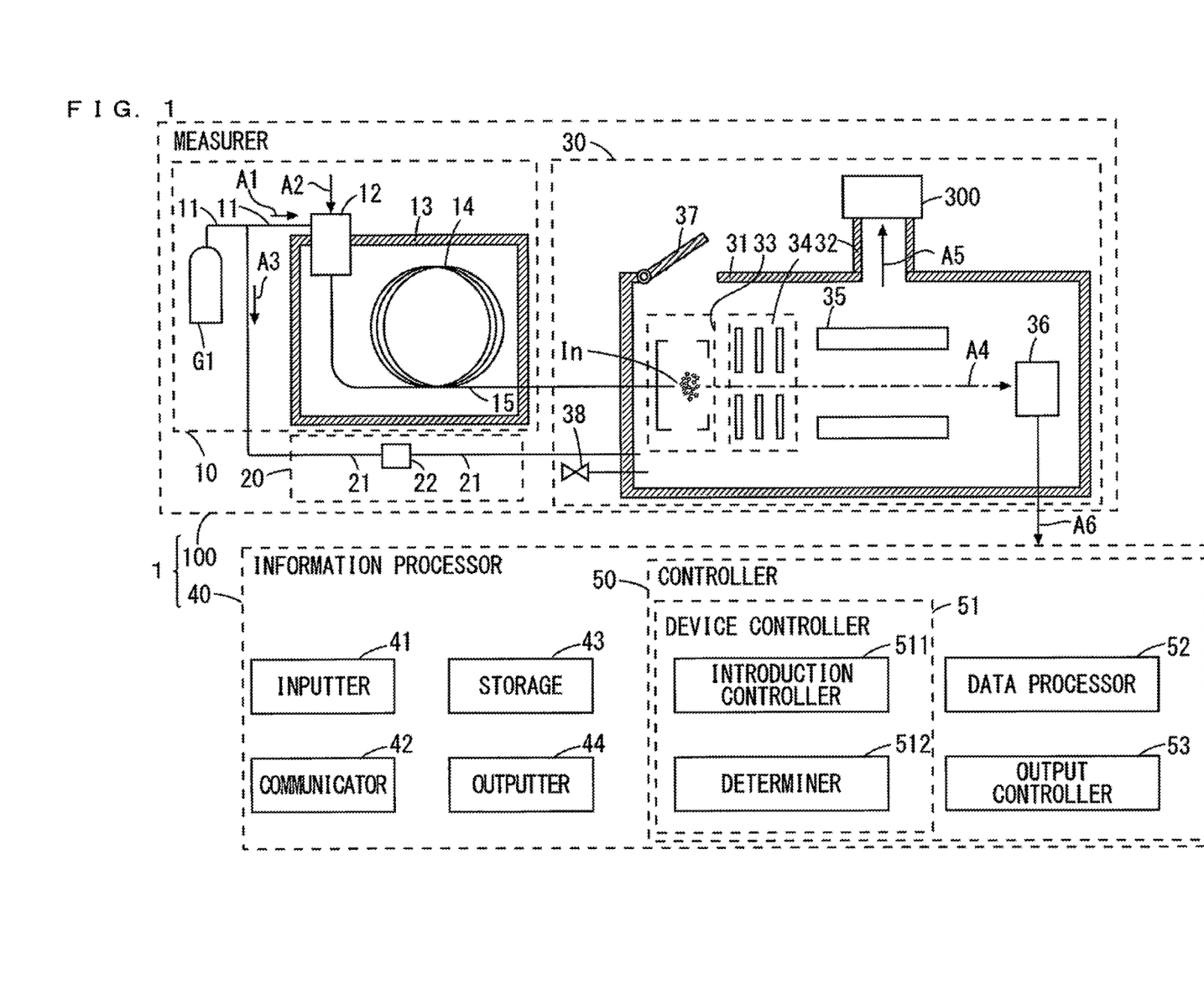
FIG. 1 is a conceptual diagram showing the configuration of a mass spectrometry device of one embodiment.

FIG. 1 is a conceptual diagram showing the configuration of the mass spectrometry device of the present embodiment. The mass spectrometry device 1 is a Gas Chromatograph-Mass Spectrometer (hereinafter referred to as a GC-MS) and includes a measurer 100 and an information processor 40. The measurer 100 includes a gas chromatograph 10, a cooling gas introducer 20 and a mass spectrometry unit 30.

The gas chromatograph 10 includes a carrier gas supply source G1, a carrier gas flow path 11, a sample introducer 12, a column temperature adjustor 13, a separation column 14 and a sample gas introduction tube 15. The cooling gas introducer 20 includes a cooling gas flow path 21 and a flow rate controller 22. The mass spectrometry unit 30 includes a vacuum container 31, an exhaust port 32, an ionizer 33 that ionizes a sample to be analyzed and produces ions In, an ion adjuster 34, a mass separator 35, a detector 36, an opening-closing portion 37, a release valve 38 and a vacuum exhaust system 300.

The information processor 40 includes an inputter 41, a communicator 42, a storage 43, an outputter 44 and a controller 50. The controller 50 includes a device controller 51, a data processor 52 and an output controller 53. The device controller 51 includes an introduction controller 511 and a determiner 512.

The measurer 100 functions as a separator that separates a sample into components (hereinafter referred to as sample components) by a separation analysis and detects each sample component obtained by separation.

The gas chromatograph 10 obtains sample components by separation based on physical properties or chemical properties. A sample is gas or gaseous when being introduced into the separation column 14 and is referred to as a sample gas.

The carrier gas supply source G1 includes a container housing a carrier gas and supplies the carrier gas to the carrier gas flow path 11. In the carrier gas flow path 11, a first end, which is one end, is connected to the carrier gas supply source G1 such that a carrier gas can flow, and a second end, which is its other end, is connected to the sample introducer 12 such that the carrier gas can be introduced. As described below, the carrier gas flow path 11 branches into the cooling gas flow path 21 in the middle of the flow path. A flow rate or the like of a carrier gas introduced into the carrier gas flow path 11 from the carrier gas supply source G1 is adjusted by a carrier gas flow rate controller (not shown) arranged in the middle of the carrier gas flow path 11, and then the carrier gas is introduced into the sample introducer 12 (the arrow A1). The sample introducer 12 includes a chamber such as a sample vaporization chamber for housing a sample and temporarily contains the sample injected by an injector (not shown) such as a syringe or an autosampler. In a case where the sample is liquid, the sample introducer 12 vaporizes the sample and introduces a sample gas into the separation column 14 (the arrow A2).

The separation column 14 includes a column such as a capillary column. The temperature of the separation column 14 is adjusted to several hundred ° C. or lower, for example, by the column temperature adjustor 13 including a column oven, etc. A sample gas is separated into components based on a distribution coefficient between a mobile phase and a stationary phase of the separation column 14, etc., and components into which the sample gas is separated are respectively eluted from the separation column 14 at different times and introduced into the ionizer 33 of the mass spectrometry unit 30 through the sample gas introduction tube 15.

The cooling gas introducer 20 adjusts the pressure, etc. of a cooling gas for cooling the ionizer 33 and introduces the cooling gas into the vacuum container 31.

In the present embodiment, a carrier gas is used as a cooling gas. A carrier gas used as a cooling gas can be an inert gas such as helium, nitrogen or argon.

A cooling gas is preferably highly thermally conductive in terms of efficient cooling of the ionizer 33. In regard to a cooling gas, a thermal conductivity constant which is an index for the level of thermal conductivity is preferably not less than 10 mW/(m·K), is more preferably not less than 20 mW/(m·K) and even more preferably not less than 100 mW/(m·K), at 1 atm and 0° C.

In the cooling gas flow path 21, a first end is connected to the carrier gas flow path 11 such that a cooling gas (a carrier gas) can flow, and a second end, which is the other end, is connected to the vacuum container 31. Further, a cooling gas can be introduced into the vacuum container 31.

The carrier gas supply source G1 and the cooling gas flow path 21 may be directly connected to each other without the carrier gas flow path 11. In this case, the first end, which is one end of the cooling gas flow path 21, is connected to the carrier gas supply source G1 such that a cooling gas (a carrier gas) can flow, and the second end, which is the other end of the cooling gas flow path 21, is connected to the vacuum container 31 such that a cooling gas can be introduced.

The flow rate controller 22 includes a flow rate control valve such as an electromagnetic valve. The flow rate controller 22 is provided in the middle of the cooling gas flow path 21, and controls the flow rate of a cooling gas by switching between introduction and non-introduction of a cooling gas into the vacuum container 31, etc. The flow rate controller 22 is controlled by the below-mentioned introduction controller 511 and introduces a cooling gas into the vacuum container 31. As described below in detail, an amount of a cooling gas introduced into the vacuum container 31 then is adjusted such that the opening-closing portion 37 can be kept locked by a difference in pressure between the inside and outside of the vacuum container 31. The flow rate controller 22 may further include at least one of a pressure regulator, a resistor, a pressure gauge and a flowmeter, etc. and may be configured to adjust the pressure or the flow rate of a cooling gas with the use of them. Further, a restriction such as an orifice may be provided in the cooling gas introducer 20, and the pressure of a cooling gas may be prevented from becoming too high.

The mass spectrometry unit 30 includes a mass spectrometer, ionizes a sample introduced into the ionizer 33 and detects the sample by mass separation. A path of ions In that are derived from a sample and produced in the ionizer 33 is schematically indicated by the arrow A4.

As long as being able to detect ions In derived from a sample with desired accuracy by mass separation, the type of a mass spectrometer that constitutes the mass spectrometry unit 30 is not limited in particular. A mass spectrometer that includes one or more mass spectrometers of any type may be used.

The vacuum container 31 of the mass spectrometry unit 30 includes the exhaust port 32. The exhaust port 32 is connected to a vacuum exhaust system 300 to enable exhaust. The vacuum exhaust system 300 includes a pump such as a turbo-molecular pump that can realize a high vacuum state such as $10^{-2}$ Pa or less and its auxiliary pump. In FIG. 1, exhaust of gas in the vacuum container 31 is indicated schematically by the arrow A5.

The cooling gas flow path 21 may be connected to the above-mentioned vacuum exhaust system 300 such that a cooling gas can be introduced. In this case, an introduction port for a cooling gas is formed at the above-mentioned turbo-molecular pump, for example, and the cooling gas flow path 21 is connected to the introduction port such that a cooling gas can be introduced. A cooling gas is introduced from the introduction port when this turbo molecular pump is stopped. An introduced cooling gas flows in a direction opposite to a direction of the exhaust by the turbo molecular pump through a flow path inside of the turbo molecular pump from the introduction port and is introduced into the vacuum container 31 through the exhaust port 32.

The ionizer 33 of the mass spectrometry unit 30 includes an ion source and ionizes a sample or the like introduced into the ionizer 33 by electronic ionization. The ion source includes an ionization chamber, a thermion generating filament, a trapping electrode and the like (not shown), accelerates a thermion produced in the thermion generating filament at a voltage such as several tens of eV applied to the trapping electrode and irradiates molecules in the ionization chamber with the thermion to produce ions In. Because a sample is dissociated when being electronically ionized, ions In include fragment ions obtained by dissociation of the sample. Ions In produced by the ionizer 33 are introduced into the ion adjuster 34.

The ionizer 33 may perform chemical ionization. As long as an ion source is heated, ionization is performed and an ion source may contaminated by a high boiling compound or the like when the temperature of the ion source is returned to a room temperature, a type of the ion source and an ionization method are not limited in particular.

The ionizer 33 is kept at a pressure equal to or lower than an allowable pressure for the ionizer and at a high temperature such as a temperature from 140° C. to 350° C. except during maintenance by exhaust by the vacuum exhaust system 300 and heating by a heater (not shown). The ionizer 33 includes a temperature sensor (not shown) such as a platinum sensor in order to measure the temperature of the ionizer 33.

The ion adjuster 34 of the mass spectrometry unit 30 includes an ion transport system such as a lens electrode or an ion guide and makes adjustment by converging a flux of ions In using electromagnetic action, etc. Ions In emitted from the ion adjuster 34 are introduced into the mass separator 35.

The mass separator 35 of the mass spectrometry unit 30 includes a quadrupole mass filter and performs mass separation of introduced ions In. The mass separator 35 causes ions In to pass selectively based on an m/z value by a voltage applied to the quadrupole mass filter. Ions In obtained by mass separation in the mass separator 35 enter the detector 36.

The detector 36 of the mass spectrometry unit 30 includes an ion detector and detects entered ions In. The detector 36 converts a detection signal obtained by detection of entered ions In into a digital signal by an A/D converter (not shown) and outputs the digitalized detection signal to the information processor 40 as measurement data (the arrow A6).

The opening-closing portion 37 of the mass spectrometry unit 30 includes an opening-closing mechanism such as a door that can be opened and closed manually. In the following description, an open state of the opening-closing portion 37 is a state where the user can take out and maintain the ionizer 33, for example, a state where the door is opened. A close state of the opening-closing portion 37 is a state where a difference in pressure between the inside and outside of the vacuum container 31 can be maintained, for example, as a state where the door is closed. In the close state, a state where the opening-closing portion is locked not to be put in the open state by an external force such as the user is referred to as a locked state and a state where the opening-closing portion is not locked is referred to as an unlocked state, as described below. In the mass spectrometry device 1 of the present embodiment, the opening-closing portion 37 is configured to switch between the locked state and the unlocked state by a difference in pressure between the inside and outside of the vacuum container 31.

Figure 2A:
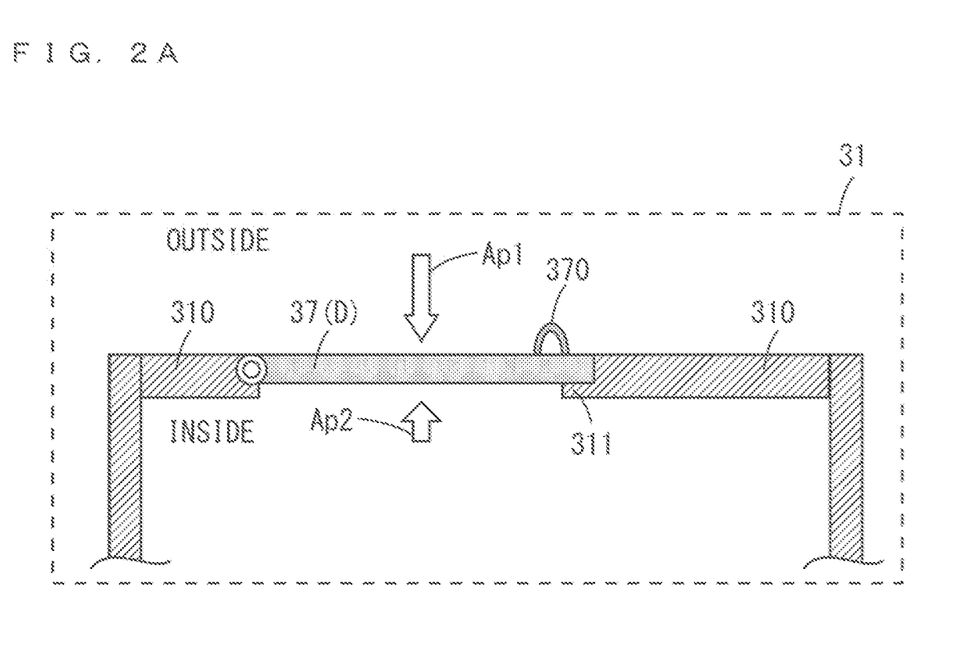
FIG. 2A is a conceptual diagram showing a locked opening-closing portion in the one embodiment, and FIG.

FIG. 2A is a conceptual diagram showing the opening-closing portion 37 in the locked state. The door D that is the opening-closing portion 37 is provided at the vacuum partition wall 310 of the vacuum container 31. The door D is constituted by a vacuum partition wall to keep a vacuum in the vacuum container 31 in the close state. A handle 370 is attached to an external surface of the vacuum container 31.

The pressure inside of the vacuum container 31 is a first pressure that is lower than the pressure outside of the vacuum container 31 by a value equal to or higher than a certain value. At this time, the opening-closing portion 37 is pressed against a projection portion 311 of the vacuum partition wall 310 by a pressure equivalent to the difference between the outside and inside of the vacuum container 31. Thus, the user cannot open the opening-closing portion 37 with the use of the handle 370. FIG. 2A schematically shows the pressure outside of the vacuum container 31 with the arrow Ap1 and shows the pressure inside of the vacuum container 31 with the arrow Ap2 (they are applied similarly in FIG. 2B).

Figure 2B:
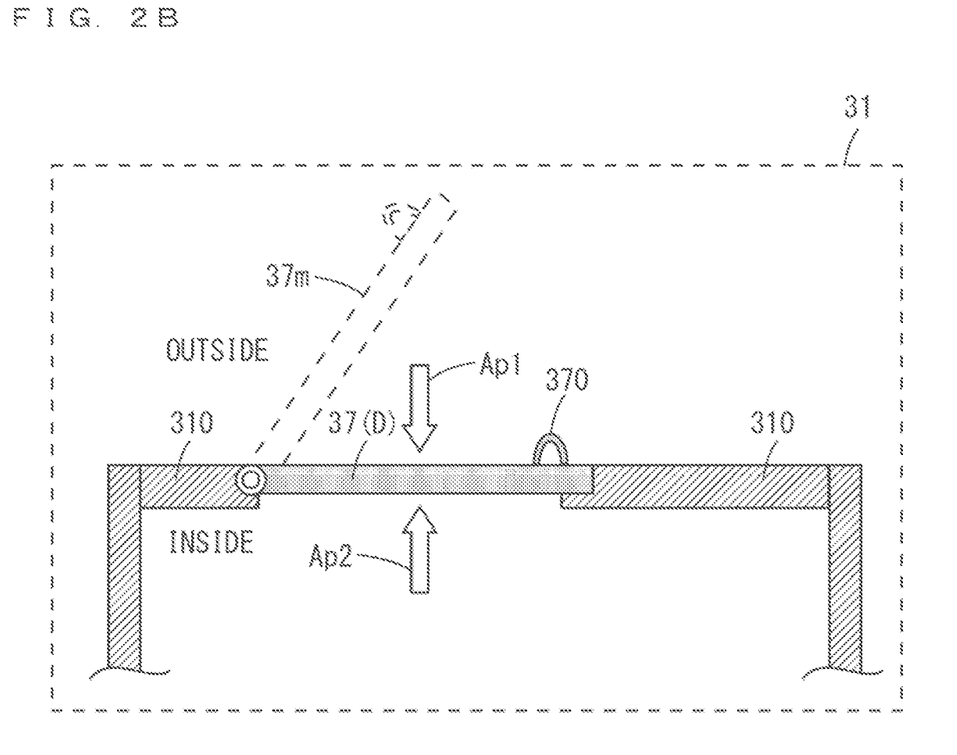

FIG. 2B is a conceptual diagram showing the opening-closing portion 37 in the unlocked state. The pressure inside of the vacuum container 31 is a second pressure that is higher than the above-mentioned first pressure. At this time, the pressure equivalent to the difference between the outside and inside of the vacuum container 31 is smaller than the pressure in the case of FIG. 2A. Thus, the user can open the opening-closing portion 37 with the use of the handle 370. The opening-closing portion 37m that is put in the open state when the user opens the door D is indicated by broken lines.

The opening-closing portion 37 may be opened by automatic control. In this case, a force generated by mechanical control in order to open the opening-closing portion 37 can be set smaller than a force generated by a difference in pressure between the inside and outside of the vacuum container 31.

Returning to FIG. 1, the release valve 38 of the mass spectrometry unit 30 is a valve in which a first end, which is one end, is connected to the outside of the vacuum container 31 and a second end, which is the other end, is connected the inside of the vacuum container 31 such that air can flow. The release valve 38 is to prevent the pressure in the vacuum container 31 from becoming too high. In a case where a cooling gas is introduced into the vacuum container 31 excessively, the release valve 38 releases the cooling gas into the atmospheric pressure in order to prevent a negative effect on the vacuum container 31 or its internal components. The release valve 38 is configured to open when the pressure in the vacuum container 31 is a predetermined pressure exceeding the atmospheric pressure. Therefore, the release valve 38 limits the pressure in the vacuum container 31 to a pressure equal to or lower than the predetermined pressure. The predetermined pressure is set to a pressure that does not negatively affect the vacuum container 31 or its internal components.

The information processor 40 includes an information processing apparatus such as an electronic calculator and executes processes such as communication, storage, calculation, etc. in regard to various data in addition to serving as an interface with respect to a user of the mass spectrometry device 1 (hereinafter simply referred to as a "user.")

The measurer 100 and the information processor 40 may be configured as one integrated device.

The inputter 4 is constituted by an input device such as a mouse, a keyboard, various buttons or a touch panel. The inputter 41 receives information and so on required for control of the measurer 100 or a process executed by the controller 50 from the user. For example, the inputter 41 receives an instruction for stopping exhaust of the vacuum container 31, etc. The communicator 42 is constituted by a communication device that can communicate via wireless connection or wired communication such as the Internet, and suitably transmits and receives data and so on in regard to the control of the measurer 100 or a process executed by the controller 50.

The storage 43 is constituted by a non-volatile storage medium and stores a program and data for execution of a process by the controller 50, and measurement data, etc. The outputter 44 is constituted by a display device such as a liquid crystal monitor, a printer or the like. The outputter 44 outputs information relating to a process executed by the controller 50 or the like by displaying the information in the display device or printing the information with the use of a printer.

The controller 50 includes a processing device such as a CPU (Central Processing Unit), and serves as a main constituent of behavior of the mass spectrometry device 1 by controlling the measurer 100, processing measurement data, etc.

The device controller 51 of the controller 50 controls the behavior of each component of the measurer 100. For example, the device controller 51 can detect ions In in a scan mode in which an m/z of ions passing through the mass separator 35 changes continuously or an SIM (Selective Ion Scanning) mode in which ions having a specific m/z pass. In this case, the device controller 51 changes a voltage of the mass separator 35 such that ions In having an m/z that is set based on input from the inputter 41, or the like selectively pass through the mass separator 35.

The introduction controller 511 of the device controller 51 stops exhaust by the vacuum exhaust system 300 and heating by the heater (not shown) that heats the ionizer 33 and then controls the cooling gas introducer 20 to introduce a cooling gas into the vacuum container 31. The introduction controller 511 controls introduction of a cooling gas such that the opening-closing portion 37 is kept locked (see FIG. 2A) by a difference in pressure between the inside and outside of the vacuum container 31 after the cooling gas is introduced.

The storage 43 stores a protocol for cooling gas introduction that keeps the opening-closing portion 37 in the locked state in advance. The protocol is defined by a period of time during which the flow rate control valve of the flow rate controller 22 is opened or the pressure of a cooling gas adjusted by the flow rate controller 22, for example. The introduction controller 511 makes reference to the protocol and controls the cooling gas introducer 20 based on the protocol to introduce a cooling gas into the vacuum container 31.

The above-mentioned protocol is set as described below, for example. A value obtained when a product, of the pressure inside of the vacuum container 31 after a cooling gas is introduced and the area of the surface of the opening-closing portion 37 to which the pressure is applied, is subtracted from a product, of the atmospheric pressure and the area of the surface of the opening-closing portion 37 to which the atmospheric pressure is applied, is a pressing force applied to the opening-closing portion 37. The above-mentioned protocol is set such that the pressing force is larger than a force normally used to open the opening-closing portion 37 by the user.

A pressure gauge for measuring the pressure inside of the vacuum container 31 may be included. Further, feedback control in regard to introduction of a cooling gas may be performed based on the pressure inside of the vacuum container 31 that is measured by the pressure gauge after the cooling gas is introduced such that the pressure is a predetermined pressure that can cool the ion source efficiently while keeping the locked state.

In a case where the below-mentioned determiner 512 determines that cooling of the ionizer 33 is finished, the introduction controller 511 controls the cooling gas introducer 20 to introduce a cooling gas into the vacuum container 31 again and increases the pressure in the vacuum container 31 to the atmospheric pressure or the like. Thus, the opening-closing portion 37 is unlocked. In this manner, the introduction controller 511 and the cooling gas introducer 20 functions as switchers that switch the opening-closing portion 37 from the locked state to the unlocked state.

The introduction controller 511 may release the vacuum container 31 into the atmospheric pressure by releasing a valve (not shown) provided in the vacuum container 31.

The determiner 512 of the device controller 51 determines whether cooling of the ionizer 33 is finished. The determiner 512 determines that cooling of the ionizer 33 is finished when the temperature of the ionizer 33 measured by a temperature sensor (not shown) is a predetermined value. The predetermined value is set based on a temperature at which the ionizer 33 is not negatively affected by oxidation, adherence of a compound or the like even when the inside of the vacuum container 31 is released to an atmosphere.

The determiner 512 may determine that cooling of the ionizer 33 is finished based on a period of time elapsed since the heater (not shown) for heating the ionizer 33 stops heating, a period of time elapsed since introduction of a cooling gas, a period of time elapsed since the temperature of the ionizer 33 is lowered to the above-mentioned predetermined value, etc.

The data processor 52 of the controller 50 processes and examines measurement data. An examination method is not limited in particular. For example, the data processor 52 produces data corresponding to a mass spectrum or mass chromatogram from measurement data and calculates a peak intensity or a peak area corresponding to each of sample components as an intensity corresponding to the sample component. The data processor 52 can calculate a concentration or the like of a sample component in a sample from a calculated intensity.

The output controller 53 produces an output image including information representing a state of device control by the device controller 51 or information representing a result of examination obtained by a process executed by the data processor 52. The output controller 53 controls the outputter 44 and causes the outputter 44 to output the output image.

(Regarding Mass Spectrometry Method)

Figure 3:
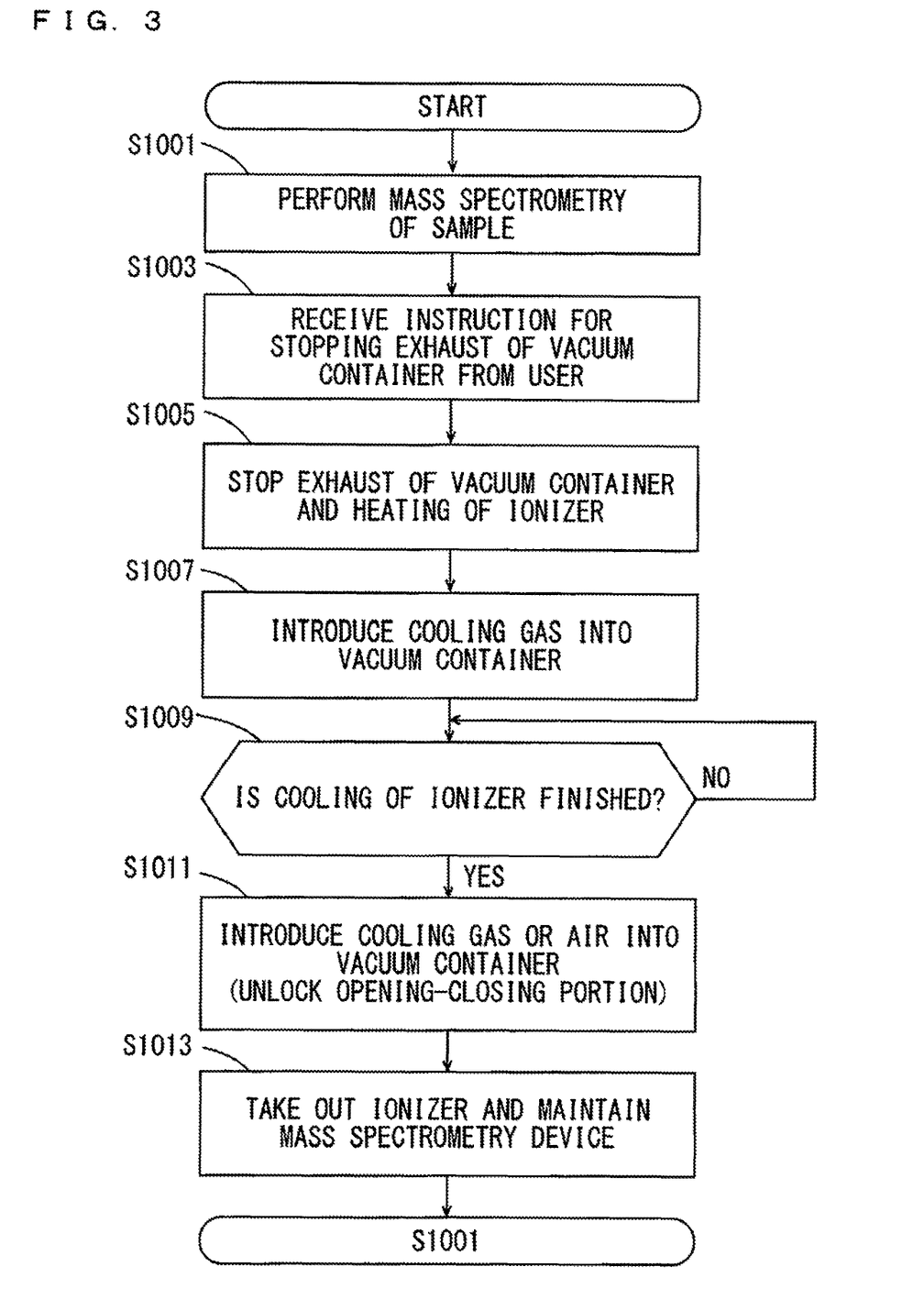
FIG. 3 is a flowchart showing a flow of a mass spectrometry method according to the one embodiment.

FIG. 3 is a flowchart showing a flow of a mass spectrometry method including a method of maintaining the mass spectrometry device according to the present embodiment. The inside of the vacuum container 31 is under vacuum, and the opening-closing portion 37 is in the locked state, in advance. In the step S1001, the mass spectrometry device 1 performs mass spectrometry on a sample. When the step S1001 ends, the step S1003 is started. In the step S1003, the inputter 41 receives an instruction for stopping exhaust of the vacuum container 31 from the user. When the step S1003 ends, the step S1005 is started.

In the step S1005, the introduction controller 511 stops exhaust of the vacuum container 31 and heating of the ionizer 33. When the step S1005 ends, the step S1007 is started. the step S1007, the cooling gas introducer 20 introduces a cooling gas into the vacuum container 31. When the step S1007 ends, the step S1009 is started.

In the step S1009, the determiner 512 determines whether cooling of the ionizer 33 is finished. In a case where the cooling is finished, the determiner 512 makes affirmative determination in regard to the step S1009, and the step S1011 is started. In a case where the cooling is not finished, the determiner 512 makes negative determination in regard to the step S1009, and the step S1009 is started again.

In the step S1011, the introduction controller 511 introduces a cooling gas or air into the vacuum container 31. This unlocks the opening-closing portion 37. When the step S1011 ends, the step S1013 is started. In the step S1013, the user takes out the ionizer 33 and maintains the mass spectrometry device 1. When the step S1013 ends, the process returns to the step S1001.

Following modifications is in the scope of the present invention and can be combined with the above-mentioned embodiment. In the below-mentioned modified example, parts having structure and functions similar to those of the above-mentioned embodiment are denoted with the same reference numerals, and a description will suitably be not repeated.

Modified Example 1

Although the mass spectrometry device 1 is a GC-MS in the above-mentioned embodiment, as long as a mass spectrometry device has an ion source that is heated to be used and may be negatively affected such as being contaminated by a high boiling compound or the like when the temperature is returned to a room temperature, its type is not limited in particular.

Modified Example 2

In the above-mentioned embodiment, a carrier gas is used as a cooling gas. However, a cooling gas may be supplied from a cooling gas supply source different from the carrier gas supply source G1. In this case, the type of a cooling gas is not limited in particular unless the cooling gas does not adhere to an ion source or react with the ion source, and an inert gas such as helium, nitrogen or argon can be used.

Modified Example 3

In the above-mentioned embodiment, the opening-closing portion 37 is configured to be in the locked state due to a difference in pressure between the inside and outside of the vacuum container 31. However, a mass spectrometry device may include a switcher that switches the opening-closing portion 37 between the locked state and the unlocked state by an actuator including a latch mechanism, etc.

Figure 4:
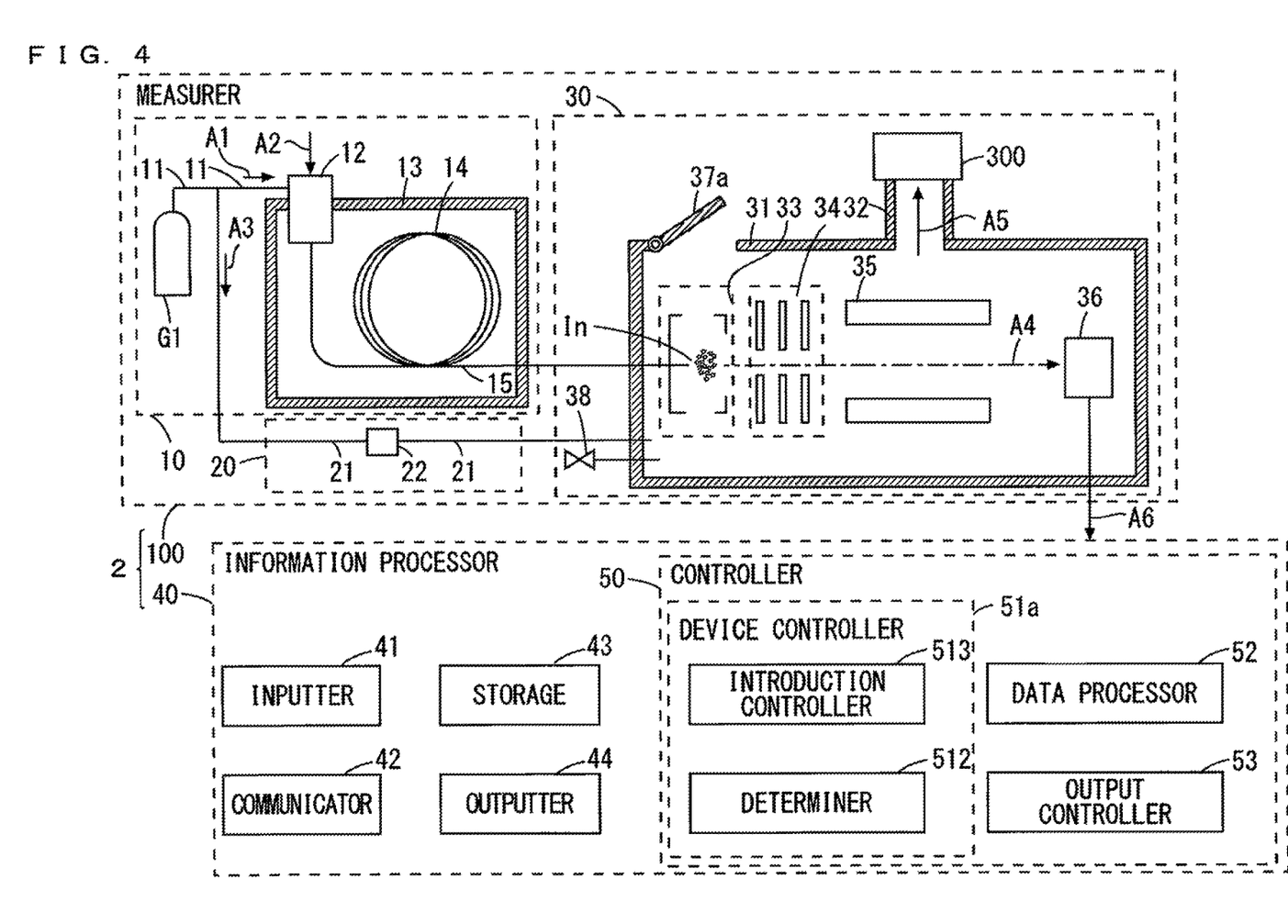
FIG. 4 is a conceptual diagram showing the configuration of a mass spectrometry device of a modified example.

FIG. 4 is a conceptual diagram showing the configuration of a mass spectrometry device 2 of a present modified example. The mass spectrometry device 2 is different from the above-mentioned embodiment in that the opening-closing portion 37 or the device controller 51 of the above-mentioned embodiment is not included, and an opening-closing portion 37a and a device controller 51a are included instead. The device controller 51a includes an introduction controller 513 and a determiner 512.

Figure 5A:
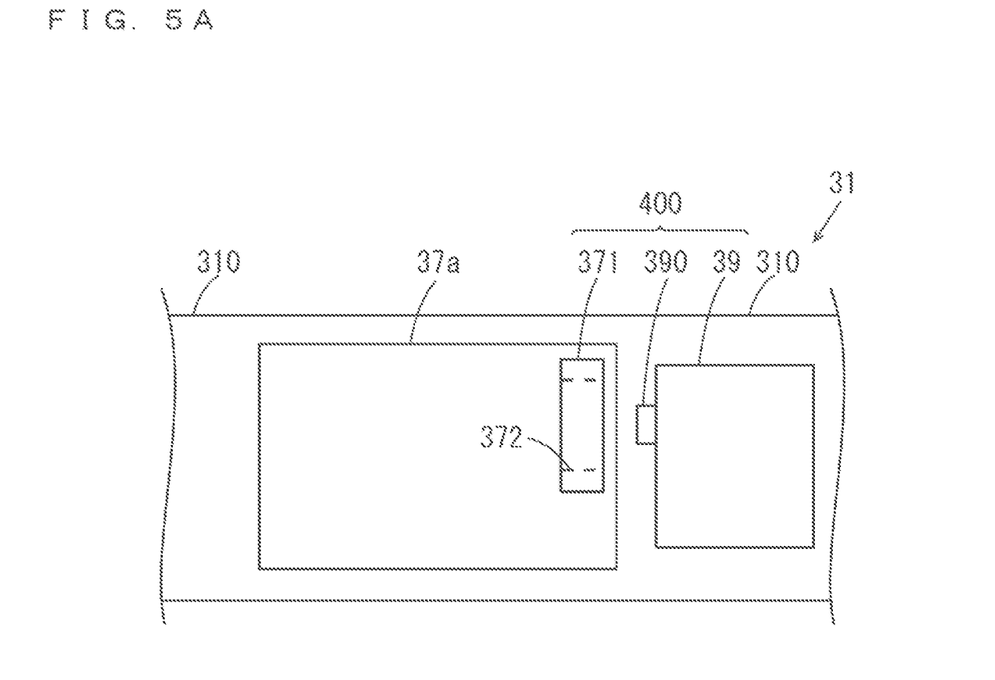
FIG. 5A is a conceptual diagram showing an unlocked opening-closing portion in the modified example.

FIG. 5A is a conceptual diagram showing the opening-closing portion 37a in a locked state. FIG. 5A is a diagram of the opening-closing portion 37a as viewed from the inside of a vacuum container 31. The mass spectrometry device 2 includes the opening-closing portion 37a and a latch mechanism 400 provided at a vacuum partition wall 310. The latch mechanism 400 includes a hollow member 371, a bar-shaped member 390 and a driving device 39 such as a motor and functions as the above-mentioned switcher. In the opening-closing portion 37a, the hollow member 371 is formed at the inner side surface of the vacuum container in addition to the structure (FIG. 2A) similar to that of the above-mentioned opening-closing portion 37. The hollow member 371 includes a hollow portion 372 that penetrates from the left to right of the hollow member 371 in FIG. 5A. The hollow portion 372 is schematically indicated by the broken lines. In the state of FIG. 5A, the user can put the opening-closing portion 37a in an open state by pulling the handle 370 (FIG. 2A), so that the opening-closing portion 37a is not locked.

Figure 5B:
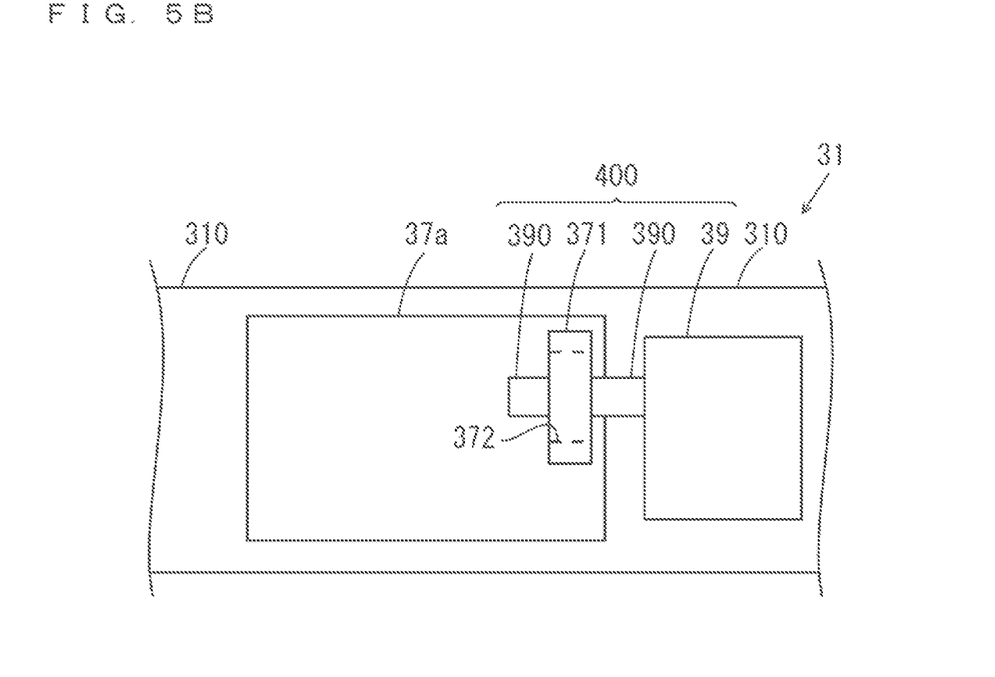
FIG. 5B is a conceptual diagram showing a locked opening-closing portion in the modified example.

FIG. 5B is a conceptual diagram showing the opening-closing portion 37a in an unlocked state. The bar-shaped member 390 is moved and fixed in a state of penetrating the hollow portion 372 of the hollow member 371 by driving of the driving device 39. The driving device 39 is controlled by the device controller 51a. In the state of FIG. 5B, the opening-closing portion 37a does not open because of the contact of the bar-shaped member 390 with the hollow member 371 even when the user pulls the handle 370 (FIG. 2A). Thus, the opening-closing portion 37a is locked.

Although the introduction controller 513 performs the control substantially similarly to the introduction controller 511, it is not necessary to make the pressure in the vacuum container 31 be the above-mentioned first pressure that is equal to or lower than a predetermined pressure in order to lock the opening-closing portion 37 (FIG. 2A) when a cooling gas is introduced. The introduction controller 513 may introduce a cooling gas into the vacuum container 31 until the pressure is any pressure that is about the same as the atmospheric pressure, or equal to or higher than the atmospheric pressure, for example.

Figure 6:
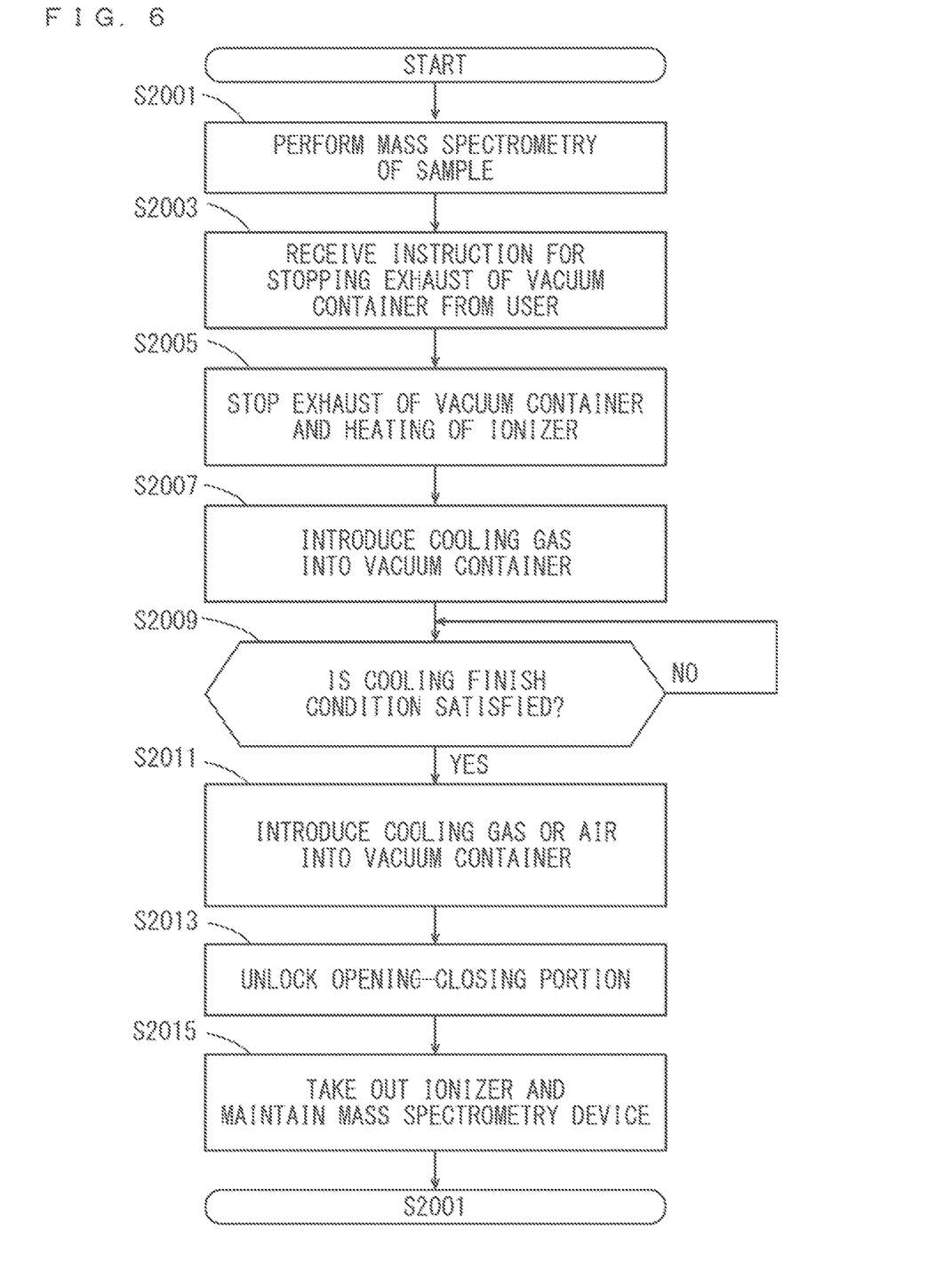
FIG. 6 is a flowchart showing a flow of a mass spectrometry method according to the modified example.

FIG. 6 is a flowchart showing a flow of a mass spectrometry method including a method of maintaining the mass spectrometry device according to the present modified example. The inside of the vacuum container 31 is under vacuum, and the opening-closing portion 37a is in the locked state, in advance. The steps S2001 to S2005 are similar to the steps S1001 to S1005 of the flowchart of FIG. 3, so that a description will not be repeated. When the step S2005 ends, the step S2007 is started. In the step S2007, the cooling gas introducer 20 introduces a cooling gas into the vacuum container 31. Here, a cooling gas is introduced into the vacuum container 31 until the pressure becomes lower than the atmospheric pressure. When the step S2007 ends, the step S2009 is started.

In the step S2009, the determiner 512 determines whether cooling of the ionizer 33 is finished. In a case where the cooling is finished, the determiner 512 makes affirmative determination in regard to the step S2009, and the step S2011 is started. In a case where the cooling is not finished, the determiner 512 makes negative determination in regard to the step S2009, and the step S2009 is started again.

In the step S2011, the introduction controller 513 introduces a cooling gas or air into the vacuum container 31. Thus, the pressure in the vacuum container 31 is substantially equal to the atmospheric pressure. When the step S2011 ends, the step S2013 is started. In the step S2013, the device controller 51a drives the driving device 39 and unlocks the opening-closing portion 37a. When the step S2013 ends, the step S2015 is started.

In the step S2015, the user takes out the ionizer 33 and maintains the mass spectrometry device 2. When the step S2015 ends, the process returns to the step S2001.

Modified Example 4

In the above-mentioned embodiment, the mass spectrometry device may include a cooler that cools a cooling gas before the cooling gas is introduced into the vacuum container 31. The cooler includes a cooling device such as a peltier element, a cooling tube through which a refrigerant flows, or the like. The cooler may cool a supply source of a cooling gas (the carrier gas supply source G1 in the above-mentioned embodiment). A cooled cooling gas is introduced into the vacuum container 31, thereby being able to cool the ionizer 33 more quickly.

Figure 7:
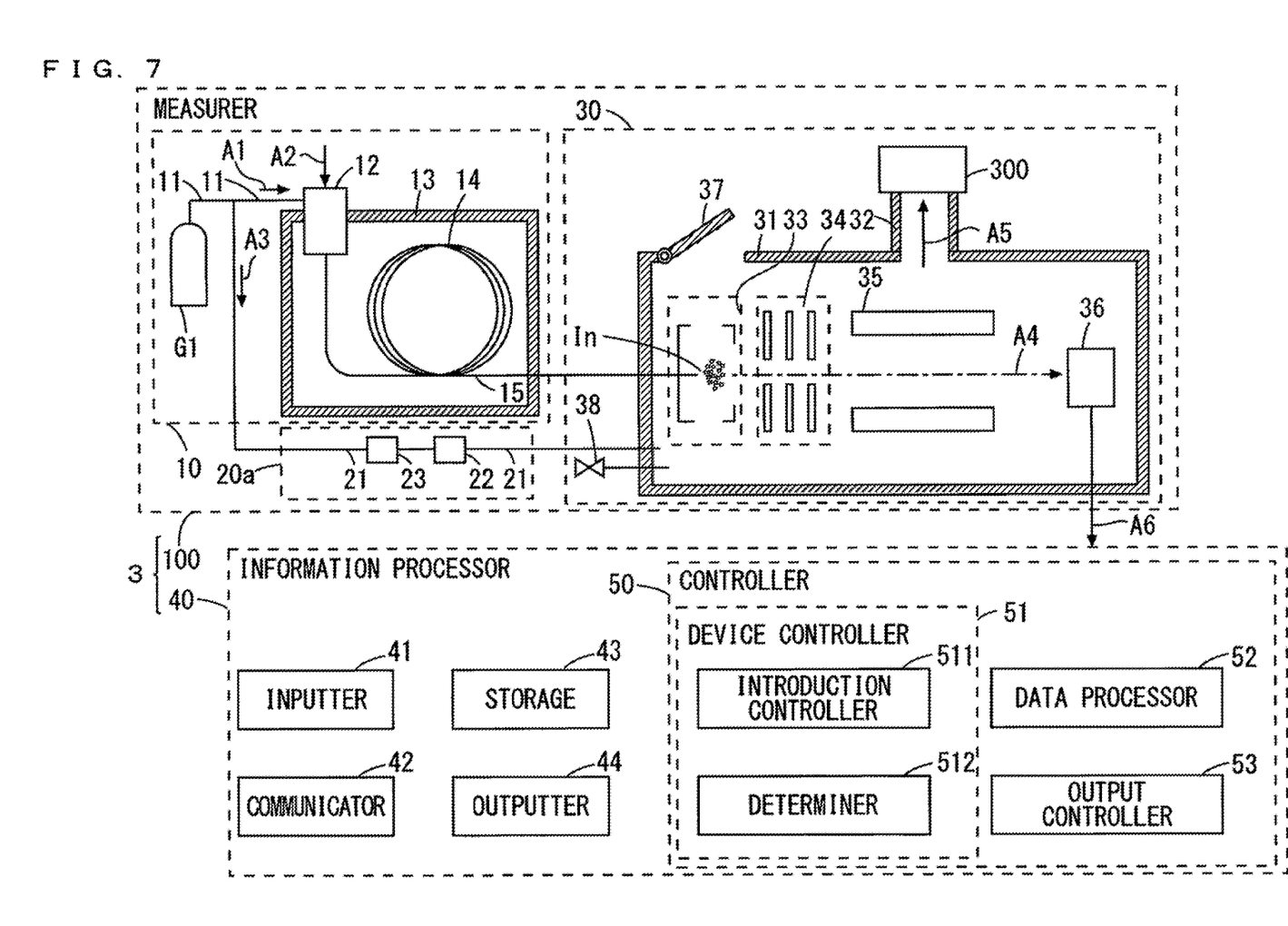
FIG. 7 is a conceptual diagram showing the configuration of a mass spectrometry device of a modified example.

FIG. 7 is a conceptual diagram showing the configuration of a mass spectrometry device 3 of the present modified example. The mass spectrometry device 3 is different from the above-mentioned mass spectrometry device 1 in not including the cooling gas introducer 20 but including a cooling gas introducer 20a. The cooling gas introducer 20a includes a cooler 23 arranged in the middle of a cooling gas flow path 21, and is configured such that a cooling gas cooled by the cooler 23 is introduced into a vacuum container 31 by releasing of a flow rate control valve of a flow rate controller 22.

(Aspects)

It is understood by those skilled in the art that the plurality of above-mentioned illustrative embodiments or modified examples are specific examples of the below-mentioned aspects.

(Item 1) A mass spectrometry device according to one aspect includes a vacuum container in which an ionizer that ionizes a sample separated in a separator and produces ions, a mass separator that performs mass separation on the ions produced in the ionizer and a detector that detects ions obtained by mass separation in the mass separator are arranged, and the mass spectrometry device includes an opening-closing portion that is provided at the vacuum container and switches between a locked state of being locked in a close state and an unlocked state by a difference in pressure between inside and outside of the vacuum container, and a cooling gas introducer that introduces a cooling gas for cooling the ionizer into the vacuum container such that the opening-closing portion is kept in the locked state. Thus, the opening-closing portion provided in the vacuum container is prevented from being opened during cooling of the ionizer, and a negative effect such as contamination on the ionizer can be suppressed.

In a case where addition, dissociation or the like of atoms or an atom group is performed in the mass separator, the "ions obtained by mass separation" include these ions obtained by addition, dissociation or the like in addition to the ions that have passed selectively through the mass separator.

(Item 2) In the mass spectrometry device according another aspect, the mass spectrometry device according to the first item includes a determiner that determines whether cooling of the ionizer is finished after the cooling gas is introduced into the vacuum container, and a switcher that introduces gas into the vacuum container and switches the opening-closing portion to the unlocked state in a case where a result of determination made by the determiner represents that cooling is finished. Thus, with the temperature of the ionizer not lowered sufficiently, the opening-closing portion provided in the vacuum container is prevented from being opened, and a negative effect such as contamination on the ionizer can be suppressed.

(Item 3) In the mass spectrometry device according to another aspect, in the mass spectrometry device according to the second item, the switcher is the cooling gas introducer and introduces the cooling gas into the vacuum container to switch the opening-closing portion to the unlocked state. Thus, the opening-closing portion can be unlocked even in a case where a gas introducer is not provided in addition to the cooling gas introducer, and the number of components in the above-mentioned vacuum container can be reduced, and processing of the above-mentioned vacuum container can be facilitated.

(Item 4) In the mass spectrometry device according to another aspect, in the mass spectrometry device according to the item 2 or 3, the determiner determines whether cooling of the ionizer is finished based on a temperature of the ionizer, a period of time elapsed since a heater for heating the ionizer stops heating, a period of time elapsed since introduction of the cooling gas or a period of time elapsed since a temperature of the ionizer is reduced to a predetermined temperature. Thus, with the use of the above-mentioned temperature or the above-mentioned periods of time, unlocking of the opening-closing portion after cooling of the ionizer is finished can be appropriately controlled, and it is suitable for automatic control.

(Item 5) In the mass spectrometry device according to another aspect, in the mass spectrometry device according to any one of the items 1 to 4, the cooling gas introducer introduces the cooling gas into the vacuum container through a vacuum exhaust system that exhausts the vacuum container. Thus, it is not necessary to provide another introduction port at the above-mentioned vacuum container, and the number of components of the above-mentioned vacuum container can be reduced, and the processing of the above-mentioned vacuum container can be facilitated.

(Item 6) In the mass spectrometry device according to another aspect, the mass spectrometry device according to any one of the items 1 to 5 includes a cooler that cools the cooling gas. Thus, the ionizer can be cooled more quickly.

(Item 7) In the mass spectrometry device according to another aspect, the mass spectrometry device according to any one of items 1 to 6 includes a release valve that limits a pressure in the vacuum container to a value equal to or lower than a predetermined upper limit value that is higher than an atmospheric pressure. Thus, the ionizer can be cooled by a cooling gas more safely.

(Item 8) The mass spectrometry device according to another aspect is the mass spectrometry device according to any one of items 1 to 7 and is a gas chromatograph-mass spectrometer. Thus, contamination of the ionizer which is a problem in maintenance, etc. of a GC-MS can be suppressed.

(Item 9) A mass spectrometry device according to one aspect includes a vacuum container in which an ionizer that ionizes a sample separated in a separator and produces ions, a mass separator that performs mass separation on the ions produced in the ionizer and a detector that detects ions obtained by mass separation in the mass separator are arranged, and the mass spectrometry device includes an opening-closing portion provided at the vacuum container, a cooling gas introducer that introduces a cooling gas for cooling the ionizer into the vacuum container, a determiner that determines whether cooling of the ionizer is finished after the cooling gas is introduced into the vacuum container, and a switcher that switches the opening-closing portion from a locked state of being locked in a close state to an unlocked state in a case where a result of determination made by the determiner represents that cooling is finished. Thus, the opening-closing portion provided at the vacuum container is prevented from being opened during cooling of the ionizer, and a negative effect such as contamination on the ionizer can be suppressed.

(Item 10) A mass spectrometry method according to one aspect is performed by a mass spectrometry device including a vacuum container in which an ionizer that ionizes a sample separated in a separator and produces ions, a mass separator that performs mass separation on the ions produced in the ionizer and a detector that detects ions obtained by mass separation in the mass separator are arranged, the vacuum container includes an opening-closing portion that switches between a locked state of being locked in a close state and an unlocked state by a difference in pressure between inside and outside of the vacuum container, and the mass spectrometry method includes introducing a cooling gas for cooling the ionizer into the vacuum container such that the opening-closing portion is kept in the locked state. Thus, the opening-closing portion provided at the vacuum container is prevented from being opened during cooling of the ionizer, and a negative effect such as contamination on the ionizer can be suppressed.

(Item 11) A mass spectrometry method according to one aspect is performed by a mass spectrometry device including a vacuum container in which an ionizer that ionizes a sample separated in a separator and produces ions, a mass separator that performs mass separation on the ions produced in the ionizer and a detector that detects ions obtained by mass separation in the mass separator are arranged, the mass spectrometry device includes an opening-closing portion that is provided at the vacuum container, and the mass spectrometry method includes introducing a cooling gas for cooling the ionizer into the vacuum container, determining whether cooling of the ionizer is finished after the cooling gas is introduced into the vacuum container, and switching the opening-closing portion from a locked state of being locked in a close state to an unlocked state in a case where a result of determination represents that cooling is finished. Thus, the opening-closing portion provided at the vacuum container is prevented from being opened during cooling of the ionizer, and a negative effect such as contamination on the ionizer can be suppressed.

The present invention is not limited to the contents of the above-mentioned embodiment. Other embodiments are possible without departing from the spirit and scope of the present invention.

REFERENCE SIGNS LIST 1, 2, 3 . . . Analysis device, 10 . . . Gas chromatograph, 11 . . . Carrier gas flow path, 12 . . . Sample introducer, 14 . . . Separation column, 20, 20a . . . Cooling gas introducers, 21 . . . Cooling gas flow path, 22 . . . Flow rate controller, 23 . . . Cooler, 30 . . . Mass spectrometry unit, 31 . . . Vacuum container, 33 . . . Ionizer, 35 . . . Mass separator, 36 . . . Detector, 37, 37a, 37m . . . Opening-closing portions, 38 . . . Release valve, 39 . . . Driving device, 40 . . . Information processor, 44 . . . Outputter, 50 . . . Controller, 51 . . . Device controller, 52 . . . Data processor, 100 . . . Measurer, 300 . . . Vacuum exhaust system, 310 . . . Vacuum partition wall, 400 . . . Latch mechanism, 511, 513 . . . Introduction controllers, 512 . . . Determiner, D . . . Door, G1 . . . Carrier gas supply source, In . . . Ions

The invention claimed is:

1. A mass spectrometry device comprising a vacuum container in which an ionizer that ionizes a sample separated in a separator and produces ions, a mass separator that performs mass separation on the ions produced in the ionizer and a detector that detects ions obtained by mass separation in the mass separator are arranged, and the mass spectrometry device comprising:
an opening-closing portion that is provided at the vacuum container and switches between a locked state of being locked in a close state and an unlocked state by a difference in pressure between inside and outside of the vacuum container; and
a cooling gas introducer that introduces a cooling gas for cooling the ionizer into the vacuum container such that the opening-closing portion is kept in the locked state.

2. The mass spectrometry device according to claim 1, comprising:
a determiner that determines whether cooling of the ionizer is finished after the cooling gas is introduced into the vacuum container; and
a switcher that introduces gas into the vacuum container and switches the opening-closing portion to the unlocked state in a case where a result of determination made by the determiner represents that cooling is finished.

3. The mass spectrometry device according to claim 2, wherein
the switcher is the cooling gas introducer and introduces the cooling gas into the vacuum container to switch the opening-closing portion to the unlocked state.

4. The mass spectrometry device according to claim 2, wherein the determiner determines whether cooling of the ionizer is finished based on a temperature of the ionizer, a period of time elapsed since a heater for heating the ionizer stops heating, a period of time elapsed since introduction of the cooling gas or a period of time elapsed since a temperature of the ionizer is reduced to a predetermined temperature.

5. The mass spectrometry device according to claim 1, wherein
the cooling gas introducer introduces the cooling gas into the vacuum container through a vacuum exhaust system that exhausts the vacuum container.

6. The mass spectrometry device according to claim 1, comprising a cooler that cools the cooling gas.

7. The mass spectrometry device according to claim 1, comprising a release valve that limits a pressure in the vacuum container to a value equal to or lower than a predetermined upper limit value that is higher than an atmospheric pressure.

8. The mass spectrometry device according to claim 1, being a gas chromatograph-mass spectrometer.

9. A mass spectrometry device comprising a vacuum container in which an ionizer that ionizes a sample separated in a separator and produces ions, a mass separator that performs mass separation on the ions produced in the ionizer and a detector that detects ions obtained by mass separation in the mass separator are arranged, and
the mass spectrometry device comprising:
an opening-closing portion provided at the vacuum container;
a cooling gas introducer that introduces a cooling gas for cooling the ionizer into the vacuum container;
a determiner that determines whether cooling of the ionizer is finished after the cooling gas is introduced into the vacuum container; and
a switcher that switches the opening-closing portion from a locked state of being locked in a close state to an unlocked state in a case where a result of determination made by the determiner represents that cooling is finished.

10. A mass spectrometry method that is performed by a mass spectrometry device comprising a vacuum container in which an ionizer that ionizes a sample separated in a separator and produces ions, a mass separator that performs mass separation on the ions produced in the ionizer and a detector that detects ions obtained by mass separation in the mass separator are arranged,
the vacuum container comprising an opening-closing portion that switches between a locked state of being locked in a close state and an unlocked state by a difference in pressure between inside and outside of the vacuum container, and
the mass spectrometry method including introducing a cooling gas for cooling the ionizer into the vacuum container such that the opening-closing portion is kept in the locked state.

11. A mass spectrometry method that is performed by a mass spectrometry device comprising a vacuum container in which an ionizer that ionizes a sample separated in a separator and produces ions, a mass separator that performs mass separation on the ions produced in the ionizer and a detector that detects ions obtained by mass separation in the mass separator are arranged,
the mass spectrometry device comprising an opening-closing portion that is provided at the vacuum container, and
the mass spectrometry method including:
introducing a cooling gas for cooling the ionizer into the vacuum container;
determining whether cooling of the ionizer is finished after the cooling gas is introduced into the vacuum container; and
switching the opening-closing portion from a locked state of being locked in a close state to an unlocked state in a case where a result of determination represents that cooling is finished.

* * * * *